(12) United States Patent
Holst

(10) Patent No.: US 11,674,591 B2
(45) Date of Patent: Jun. 13, 2023

(54) VEHICLE TRANSMISSION

(71) Applicant: ZF Friedrichshafen AG, Friedrichshafen (DE)

(72) Inventor: Sven Holst, Meckenbeuren (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/536,690

(22) Filed: Nov. 29, 2021

(65) Prior Publication Data

US 2022/0082168 A1 Mar. 17, 2022

Related U.S. Application Data

(62) Division of application No. 16/123,493, filed on Sep. 6, 2018, now Pat. No. 11,187,317.

(30) Foreign Application Priority Data

Sep. 7, 2017 (DE) .................... 10 2017 215 784.4

(51) Int. Cl.
*F16H 57/04* (2010.01)
*H02K 5/173* (2006.01)
(Continued)

(52) U.S. Cl.
CPC ........... *F16H 57/0489* (2013.01); *F16H 7/02* (2013.01); *F16H 55/36* (2013.01); *F16H 57/043* (2013.01);
(Continued)

(58) Field of Classification Search
CPC ............ F16H 57/0471; F16H 57/0476; F16H 57/0489; F16H 57/0424; F16H 57/043; H02K 7/108; H02K 9/19
(Continued)

(56) References Cited

U.S. PATENT DOCUMENTS 1,220,810 A * 3/1917 Alquist ............... F16H 57/0447
184/6.12
1,842,071 A * 1/1932 Clark .................... B21D 37/10
184/5
(Continued)

FOREIGN PATENT DOCUMENTS

CN 101657653 A 2/2010
CN 205806396 U 12/2016
(Continued)

OTHER PUBLICATIONS

Chinese Office Action 201810937447.X, dated Feb. 5, 2023. (6 pages).

*Primary Examiner* — Henry Y Liu
(74) *Attorney, Agent, or Firm* — Dority & Manning, P.A.

(57) ABSTRACT

A transmission for a motor vehicle includes an electric motor and a flexible traction drive mechanism which includes a first traction mechanism wheel, such as, a gear or pulley, which is rotationally fixed to a rotor shaft of the electric motor, a second traction mechanism wheel which can be rotationally fixed to a transmission component and which is drivingly connected to the first traction mechanism wheel by a traction mechanism, such as, a belt or chain, and a bearing journal for supporting the first traction mechanism wheel. An oil line extends through the bearing journal, and oil can be fed to the electric motor via the oil line.

17 Claims, 6 Drawing Sheets

(51) Int. Cl.
  *F16H 57/05* (2006.01)
  *F16H 7/02* (2006.01)
  *F16H 55/36* (2006.01)
  *H02K 7/108* (2006.01)
  *H02K 9/19* (2006.01)

(52) U.S. Cl.
  CPC ..... *F16H 57/0424* (2013.01); *F16H 57/0426* (2013.01); *F16H 57/0471* (2013.01); *F16H 57/0476* (2013.01); *F16H 57/05* (2013.01); *H02K 5/1732* (2013.01); *H02K 7/108* (2013.01); *H02K 9/19* (2013.01)

(58) Field of Classification Search
  USPC .............................................. 474/91; 184/5
  See application file for complete search history.

(56) References Cited

U.S. PATENT DOCUMENTS

| | | | | |
|---|---|---|---|---|
| 2,309,985 | A * | 2/1943 | Ruist | D03C 5/02 139/1 R |
| 2,522,985 | A * | 9/1950 | Bradley | H02K 7/085 310/90 |
| 2,556,435 | A * | 6/1951 | Moehrl | F04D 29/061 310/90 |
| 3,503,469 | A * | 3/1970 | Helmut | F16N 7/00 184/5 |
| 4,021,086 | A * | 5/1977 | Rajsigl | D01H 4/14 384/473 |
| 4,429,924 | A * | 2/1984 | Franz | H02K 5/1732 310/90 |
| 4,597,720 | A * | 7/1986 | Friedrichs | F04B 53/08 417/419 |
| 4,713,980 | A * | 12/1987 | Ida | B60K 17/3467 184/6.12 |
| 4,854,829 | A * | 8/1989 | Stanzani | F25B 31/023 417/369 |
| 4,922,765 | A * | 5/1990 | Hayakawa | B60K 17/344 184/6.12 |
| 4,940,341 | A * | 7/1990 | Schuetz | F16C 33/76 384/465 |
| 4,958,940 | A * | 9/1990 | Morrill | H02K 5/1675 384/398 |
| 5,007,504 | A * | 4/1991 | Hallbach | F16N 21/00 184/5 |
| 5,072,510 | A * | 12/1991 | Morrill | H02K 5/1675 29/598 |
| 5,397,223 | A * | 3/1995 | Spinnler | F01C 1/0223 184/5 |
| 5,425,679 | A * | 6/1995 | Utz | F16H 57/04 277/399 |
| 5,875,691 | A * | 3/1999 | Hata | B60K 6/547 903/952 |
| 6,000,499 | A * | 12/1999 | Nowak | B23Q 11/10 184/5 |
| 6,008,545 | A * | 12/1999 | Nagano | F02N 11/04 290/46 |
| 6,329,731 | B1 * | 12/2001 | Arbanas | F16H 57/0416 310/58 |
| 6,582,331 | B1 * | 6/2003 | Baxter, Jr. | F16H 57/05 474/91 |
| 6,863,140 | B2 * | 3/2005 | Noreikat | B60W 10/06 903/952 |
| 6,881,168 | B2 * | 4/2005 | Bowen | B60W 20/40 903/910 |
| 7,211,025 | B2 * | 5/2007 | Fujioka | B60K 6/52 74/606 R |
| 7,690,280 | B2 * | 4/2010 | Chapelon | F16D 25/0638 74/661 |
| 7,815,374 | B2 * | 10/2010 | Kreitzer | F16C 33/66 384/473 |
| 7,834,492 | B2 * | 11/2010 | Iund | B60L 1/02 310/58 |
| 7,849,970 | B2 * | 12/2010 | Kreitzer | H02K 9/19 384/313 |
| 7,944,106 | B2 * | 5/2011 | Miller | F16H 57/0421 310/90 |
| 8,616,315 | B2 * | 12/2013 | Kim | H02K 9/19 180/65.1 |
| 8,678,784 | B2 * | 3/2014 | Atarashi | B60K 6/26 417/372 |
| 8,840,511 | B2 * | 9/2014 | Seno | F16H 57/0423 184/6.12 |
| 8,978,824 | B2 * | 3/2015 | Czechowski | F04D 13/12 184/6.12 |
| 9,752,671 | B2 * | 9/2017 | Kampe | F16H 57/0461 |
| 9,863,430 | B2 * | 1/2018 | Lee | F04D 29/4206 |
| 9,933,066 | B2 * | 4/2018 | Sada | F16H 57/04 |
| 10,060,514 | B2 * | 8/2018 | Nakamura | F16H 57/023 |
| 10,167,907 | B2 * | 1/2019 | Satoyoshi | B60K 6/48 |
| 10,260,607 | B2 | 4/2019 | Carter et al. | |
| 10,302,186 | B2 * | 5/2019 | Pritchard | B60K 17/3505 |
| 10,309,522 | B2 * | 6/2019 | Palazzolo | B60K 17/35 |
| 10,330,183 | B2 * | 6/2019 | McNally | B60K 17/3467 |
| 10,337,603 | B2 * | 7/2019 | Nishimine | F16H 57/0482 |
| 10,619,720 | B2 * | 4/2020 | Fujimoto | F16C 35/077 |
| 10,816,082 | B2 * | 10/2020 | Alexiou | F16H 57/0473 |
| 2004/0154846 | A1 * | 8/2004 | Kira | B60K 17/354 903/952 |
| 2006/0027192 | A1 | 2/2006 | Tsukada et al. | |
| 2006/0287150 | A1 * | 12/2006 | Kim | B60K 6/365 475/5 |
| 2008/0015085 | A1 * | 1/2008 | Chapelon | B60K 6/547 477/6 |
| 2010/0132504 | A1 * | 6/2010 | Miller | B60K 6/26 184/6.12 |
| 2011/0076165 | A1 * | 3/2011 | Atarashi | B60K 6/26 417/321 |
| 2013/0283972 | A1 * | 10/2013 | Yamamoto | B60K 6/405 903/902 |
| 2013/0305878 | A1 * | 11/2013 | Seno | F16H 57/0423 74/665 A |
| 2014/0271284 | A1 * | 9/2014 | Gray | F16C 35/045 310/90 |
| 2015/0239332 | A1 * | 8/2015 | Okuda | F16H 45/00 180/65.21 |
| 2015/0283561 | A1 * | 10/2015 | Mackel | B04B 9/04 494/10 |
| 2016/0265652 | A1 * | 9/2016 | Nishimine | B60K 6/365 |
| 2016/0290480 | A1 * | 10/2016 | Sada | F16H 57/0447 |
| 2017/0058895 | A1 * | 3/2017 | Schultz | F04C 15/0073 |
| 2018/0031078 | A1 * | 2/2018 | Bell | F16H 57/021 |
| 2018/0163848 | A1 * | 6/2018 | Quinn | F16H 7/06 |

FOREIGN PATENT DOCUMENTS

| | | |
|---|---|---|
| DE | 102010050217 A1 | 5/2012 |
| JP | 2015072054 A | 4/2015 |
| JP | 2015147491 A | 8/2015 |
| WO | WO 2005/123434 A1 | 12/2005 |

* cited by examiner

VEHICLE TRANSMISSION

CROSS-REFERENCE TO RELATED APPLICATIONS

This application is related and has right of priority to DE 102017215784.4, filed in German Patent Office on Sep. 7, 2017, and is a divisional of U.S. patent Ser. No. 11/187,317, which issues on Nov. 30, 2021 and is incorporated by reference herein in its entirety.

FIELD OF THE INVENTION

The invention relates generally to a transmission for a motor vehicle, including an electric machine or motor and a flexible traction drive mechanism which includes a first traction mechanism wheel, for example, a gear or pulley, which is rotationally fixed to a rotor shaft of the electric machine, a second traction mechanism wheel which can be rotationally fixed to a transmission component and which is drivingly connected to the first traction mechanism wheel by a traction mechanism, for example, a belt or chain, and a bearing journal for supporting the first traction mechanism wheel. The invention also relates generally to a motor vehicle transmission including such a transmission.

BACKGROUND

The use of a flexible traction drive mechanism in a motor vehicle transmission is known from the prior art. For example, WO 2005/123 434 A1 describes a chain drive, in the case of which a first traction mechanism wheel is rotationally fixed to a rotor shaft of an electric machine. A second traction mechanism wheel can be drivingly connected to a transmission input shaft by a dual clutch. The first traction mechanism wheel is drivingly connected to the second traction mechanism wheel by a chain.

In order to ensure that the electric machine has a long service life, the electric machine must be cooled during operation. The cooling of the electric machine can often be implemented in this case only with high structural complexity.

SUMMARY OF THE INVENTION

Example aspects of the invention provide a transmission, in which the cooling of the electric machine or motor takes place in an easy way.

The transmission is characterized in that an oil line extends through the bearing journal, through which oil can be fed to the electric machine.

The transmission according to example aspects of the invention has the advantage that the oil line is arranged in the bearing journal which is necessary in the case of a flexible traction drive mechanism in order to support the first traction mechanism wheel. The oil line can therefore be designed to be short because the first traction mechanism wheel supported by the bearing journal is rotationally fixed to the rotor shaft of the electric machine and, therefore, the bearing journal is arranged in the proximity of the electric machine.

A traction mechanism can be understood to be a power transmission mechanism which can be loaded in tension in a linear direction in order to transmit a force from the first traction mechanism wheel to the second traction mechanism wheel. For example, a traction mechanism can be a chain which includes chain links including openings into which individual positive engagement mechanisms of the two traction mechanism wheels engage. Alternatively thereto, the traction mechanism can also be designed as a belt, in particular as a toothed belt.

The direction indications "axial" and "radial" refer to a central axis of the transmission, unless indicated otherwise. The central axis can correspond, for example, to the axis of rotation of an input shaft of the transmission.

A rotationally fixed connection is understood to be a connection between two elements, which is formed and arranged in such a way that the two elements, which are operatively connected to each other, always have the same rotational speed. This is not the case, for example, when a shift element in the disengaged condition is arranged between the two interconnected elements. The rotationally fixed connection can be implemented, for example, in the form of a spline.

The electric machine or motor consists at least of a stator and a rotatably mounted rotor and is configured for converting electrical energy into mechanical energy in the form of rotational speed and torque when operated as a motor and for converting mechanical energy into electrical energy in the form of current and voltage when operated as a generator.

A rotor shaft is referred to as a shaft which is rotationally fixed to the rotor of the electric machine. In this case, the rotor can be arranged on the rotor shaft.

In one particular version, the oil line can extend, in particular exclusively, in the axial direction in the bearing journal. The oil line can extend through the bearing journal. In this case, an oil inlet of the oil line can be arranged at one axial end of the bearing journal and an oil outlet of the oil line can be arranged at another axial end of the bearing journal. In addition, the oil line can be arranged and designed in such a way that oil from yet another oil line arranged in a transmission housing can be fed to the electric machine by the oil line. The further oil line is fluidically connected to a main oil line. In addition to the electric machine, further components of the transmission are supplied with oil by the main oil line. A transmission housing is understood to be a housing which does not rotate during the operation of the transmission and is arranged in a fixed manner.

The rotor shaft can be arranged coaxially to the bearing journal. In addition, the rotor shaft can include another oil line which is fluidically connected to the oil line. The rotor shaft can also include a bore hole and/or another bore hole, through which oil can be fed to at least one component of the electric machine. The bore hole and/or the other bore hole can extend in the radial direction. In addition, the bore hole and the other bore hole can be spaced apart from each other. Oil from the other oil line flows through the bore hole and/or the other bore hole in an interior space of the electric machine. From there, the oil can flow to components of the electric machine, such as to winding overhangs of the electric machine, and can cool these components. In addition, it is possible that the oil is fed from the interior space of the electric machine to shaft bearings, by which the rotor shaft is supported.

In one particular version, the transmission can include a bearing, by which the first traction mechanism wheel is supported, in particular exclusively, in the radial direction on the bearing journal. The bearing can be a needle bearing. The bearing can be designed in such a way that the bearing permits an axial movement of the first traction mechanism wheel relative to the bearing journal.

A thrust race for the first traction mechanism wheel can be provided in order to keep the wear low during an axial movement of the first traction mechanism wheel relative to the bearing journal. The thrust race can be machined, in particular hardened, and/or can consist of a material such that the wear is minimized during a movement of the first traction mechanism wheel relative to the bearing journal. The thrust race can be an integral part of the bearing journal.

The bearing journal can include an, in particular circumferential, support area, by which the first traction mechanism wheel is supported in the axial direction. In this case, the thrust race can be an integral part of the support area. Therefore, wear of the first traction mechanism wheel can be reduced when the first traction mechanism wheel rests against the support area. The support area can project in the radial direction away from the remaining area of the bearing journal.

The transmission can include a bush which at least partially, in particular completely, encloses the bearing journal, in particular a part of the bearing journal, and includes the thrust race. In this case, the bearing rests directly on the bush. The bush can include an, in particular circumferential, collar for axially supporting the first traction mechanism wheel. In this case, the thrust race can be an integral part of the collar. This offers the advantage that the wear of the first traction mechanism wheel and/or of the bearing is reduced when the first traction mechanism wheel rests against the collar.

In one particular version, yet another bore hole can be provided, through which oil is fed from the oil line to the bearing. Due to the oil feed to the bearing, lubrication of the bearing can be achieved in an easy way. The further bore hole can be arranged in the bearing journal.

Alternatively, the further bore hole can be arranged in a connecting mechanism. One part of the oil line can extend through the connecting mechanism, in particular in the axial direction. In this case, the connecting mechanism can delimit the part of the oil line, in particular in the radial direction. The connecting mechanism can be breakably or removably connectable to the bearing journal. In addition, the bearing journal can be connected in a form-fit and/or friction-locking manner to the transmission housing by the connecting mechanism.

Alternatively, the further bore hole can be arranged in a coupling piece which is fluidically connected downstream from the connecting mechanism. The coupling piece can be connected at one end to the connecting mechanism and/or can include another part of the oil line. The other part of the oil line can extend through the coupling piece in the axial direction. In this case, the coupling piece can delimit the other part of the oil line in the radial direction. Versions are also possible, of course, in which the respective component includes multiple further bore holes. The further bore holes can be spaced apart from each other along the circumferential direction of the respective component.

The flexible traction drive mechanism can include an oil guide member which is arranged and designed in such a way that it diverts the oil which has flowed through the bearing in the direction of the traction mechanism. The oil guide member can be connected, in particular as a single piece, to the bush. In particular, the oil guide member can be arranged at one end of the collar and/or can be rotationally fixed to the end of the collar. Alternatively, the oil guide member can be arranged on the bearing journal, in particular on the support area of the bearing journal, and/or can be connected to the bearing journal. By the oil guide member, it can be ensured in an easy way that oil is applied to the traction mechanism.

The first traction mechanism wheel can include one additional bore hole, in particular multiple additional bore holes, through which the oil which has flowed through the further bore hole flows out of the first traction mechanism wheel. In addition, the first traction mechanism wheel can include yet another oil guide member which diverts the oil which has flowed through the additional bore hole in the direction of the traction mechanism. Due to the further oil guide member, it is ensured that oil is applied to another side of the traction mechanism. In the end, due to the oil guide member and the further oil guide member, oil is applied to the traction mechanism from both axial sides.

The further bore hole and/or the additional bore hole can be arranged upstream from the bearing. The additional bore hole can be arranged downstream from the further bore hole. In this case, an accommodating chamber enclosed by the first traction mechanism wheel can be present, into which the oil which has flowed out of the further bore hole flows. Originating from the accommodating chamber, a portion of the oil located in the accommodating chamber can flow to the bearing and another portion of the oil can flow out of the first traction mechanism wheel through the additional bore hole.

In one particular version, the first traction mechanism wheel can include a coupling portion for rotationally fixing the first traction mechanism wheel to the rotor shaft, wherein the coupling portion can enclose a cavity. The bearing journal can be designed and arranged in such a way that it extends into the cavity. Alternatively, the connecting mechanism can be designed and arranged in such a way that it extends into the cavity. In addition, the coupling piece can be designed and arranged in such a way that it extends into the cavity. The cavity can be an integral part of the other oil line. In the end, due to the aforementioned arrangement of the components, the oil flowing through the oil line flows directly into the other oil line.

The transmission component can be a shaft which is rotationally fixed to the second traction mechanism wheel. Alternatively, the transmission component can include a clutch component of a clutch, in particular of a dual clutch or a triple clutch, which is rotationally fixed, in particular welded, to the second traction mechanism wheel. The clutch component can be a disk carrier and/or a clutch housing. During operation of the transmission, the transmission component and, therefore, the second traction mechanism wheel can move in the axial direction.

The electric machine and the transmission component can be radially offset with respect to each other. In particular, a central axis of the rotor shaft can be offset in the radial direction with respect to a central axis of the shaft of the transmission component or with respect to a central axis of the clutch.

Of particular advantage is a motor vehicle including a transmission. The transmission can be an automatic transmission, by which multiple gears can be implemented with a different ratio between a transmission input shaft and a transmission output shaft.

BRIEF DESCRIPTION OF THE DRAWINGS

The subject of the invention is schematically represented in the figures and is described in the following with reference to the figures, wherein identical or identically operating elements are mostly provided with the same reference characters. Wherein.

DETAILED DESCRIPTION

Figure 1:
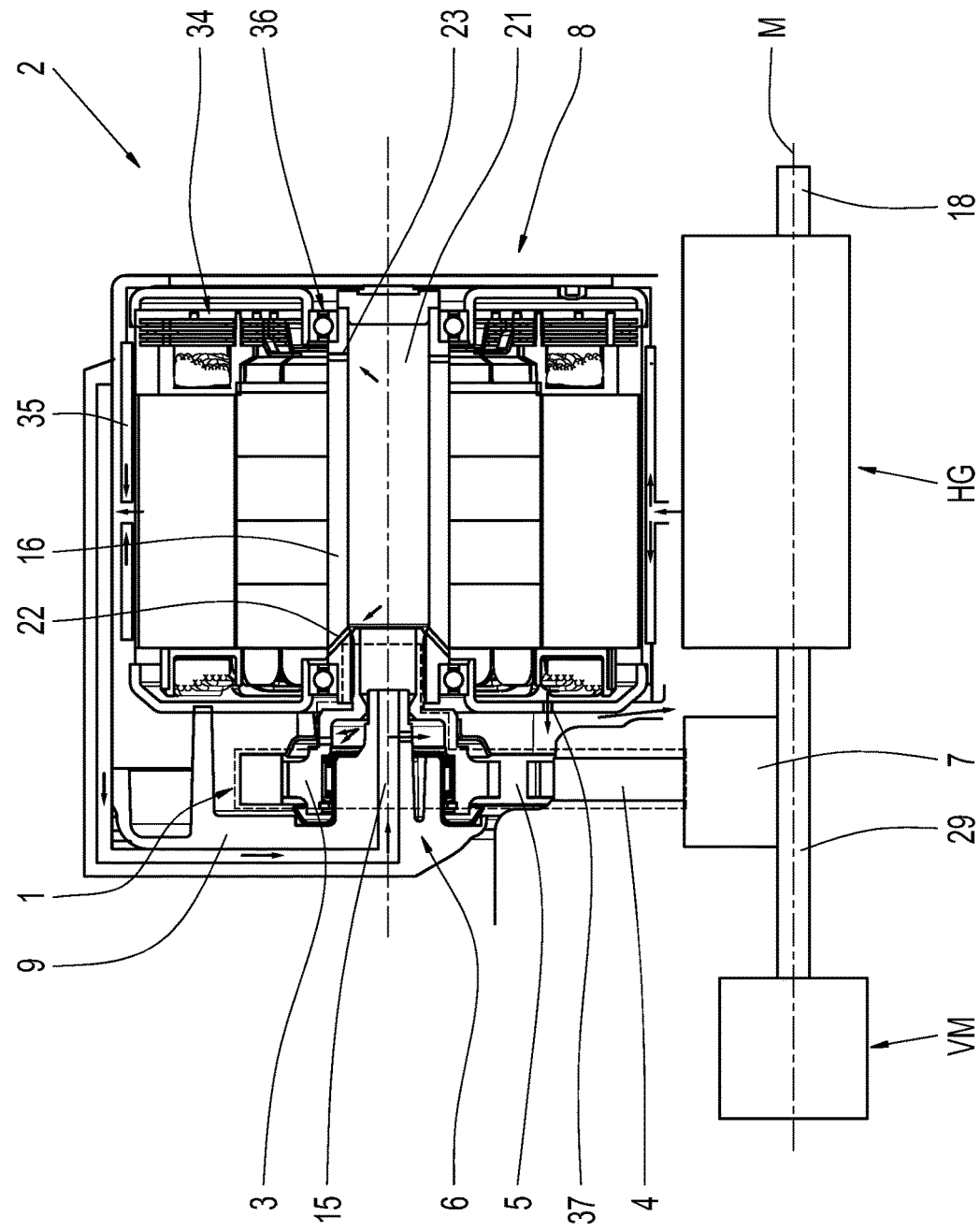
FIG. 1 shows a sectioning of the transmission according to example aspects of the invention including the flexible traction drive mechanism according to a first exemplary embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows one part of a transmission 2 including a flexible traction drive mechanism 1. The flexible traction drive mechanism 1 includes a first traction mechanism wheel 3, which is rotationally fixed to a rotor shaft 16 of an electric machine 8, and a bearing journal 6 for supporting the first traction mechanism wheel 3. The first traction mechanism wheel 3 is arranged so as to be axially movable relative to the bearing journal 6. An oil line 15 extends through the bearing journal 6 and is fluidically connected to yet another oil line 35. The further oil line 35 is fluidically connected to a main oil line which is not represented. In this case, the oil flowing through the oil line 15 can be fed to the electric machine 8. The rotor shaft 16 includes another oil line 21 which is fluidically connected to the oil line 15. The bearing journal 6 extends in the axial direction from an inner wall of a transmission housing 9. The transmission housing 9 and the bearing journal 6 are designed as a single piece.

The rotor shaft 16 also includes a bore hole 22 and another bore hole 23, which is spaced apart from the bore hole 22 in the axial direction and through which oil from the other oil line 21 can flow into an interior space of the electric machine 8. The oil which has flowed into the interior space of the electric machine 8 is fed to components of the electric machine 8, such as to winding overhangs of the electric machine 8. In addition, the oil fed into the interior space is fed to shaft bearings which support the rotor shaft 16. The oil which has flowed into the electric machine 8 flows, through an outlet opening 37, out of the interior space of the electric machine 8. The course of the oil flow between the further oil line 35 and the outlet opening 37 is illustrated in FIG. 1 with the aid of multiple arrows.

In addition, the flexible traction drive mechanism 1 includes a second traction mechanism wheel 4 which is drivingly connected to the first traction mechanism wheel 3 by a traction mechanism 5 in the form, for example, of a chain. The second traction mechanism wheel 4 is rotationally fixed to a second transmission component 7. The second transmission component 7 includes a clutch component which is not represented in greater detail in FIG. 1, such as a disk carrier, a dual clutch, a triple clutch, or a torque converter, which is rotationally fixed to the second traction mechanism wheel 4.

The second transmission component 7 is drivingly connected to a transmission input shaft 29. The transmission input shaft 29 is drivingly connected to a motor vehicle drive unit VM, such as an internal combustion engine, which does not belong to the transmission 2. In addition, the transmission input shaft 29 is drivingly connected to at least one integral part of a main transmission HG. The main transmission HG includes, for example, gear sets and shift elements which are not represented in greater detail in FIG. 1. A transmission output shaft 18 is drivingly connected at least to one of the integral parts of the main transmission HG. By controlling one or more of the shift elements of the main transmission HG, various gears, each having a different ratio, between the transmission input shaft 29 and the transmission output shaft 18 can be implemented.

The design represented in FIG. 1 is to be considered merely as an example. A separating clutch, a dual clutch, a triple clutch, or a torque converter including a torque converter lockup clutch can be additionally arranged between the motor vehicle drive unit VM and the second transmission component. The transmission output shaft 18 and the transmission input shaft 29 can be arranged on the same axial end of the main transmission HG. The transmission output shaft 18 and the transmission input shaft 29 can have axes of rotation that differ from one another, as in the case, for example, of a transmission for a front-transverse drive or a rear-transverse drive of a motor vehicle. The design represented in FIG. 1 therefore serves merely as an example, and does not limit the design of the flexible traction drive mechanism according to the invention.

The electric machine 8 and the second transmission component 7 are offset with respect to each other in the radial direction relative to a central axis M of the transmission 2.

Figure 2:
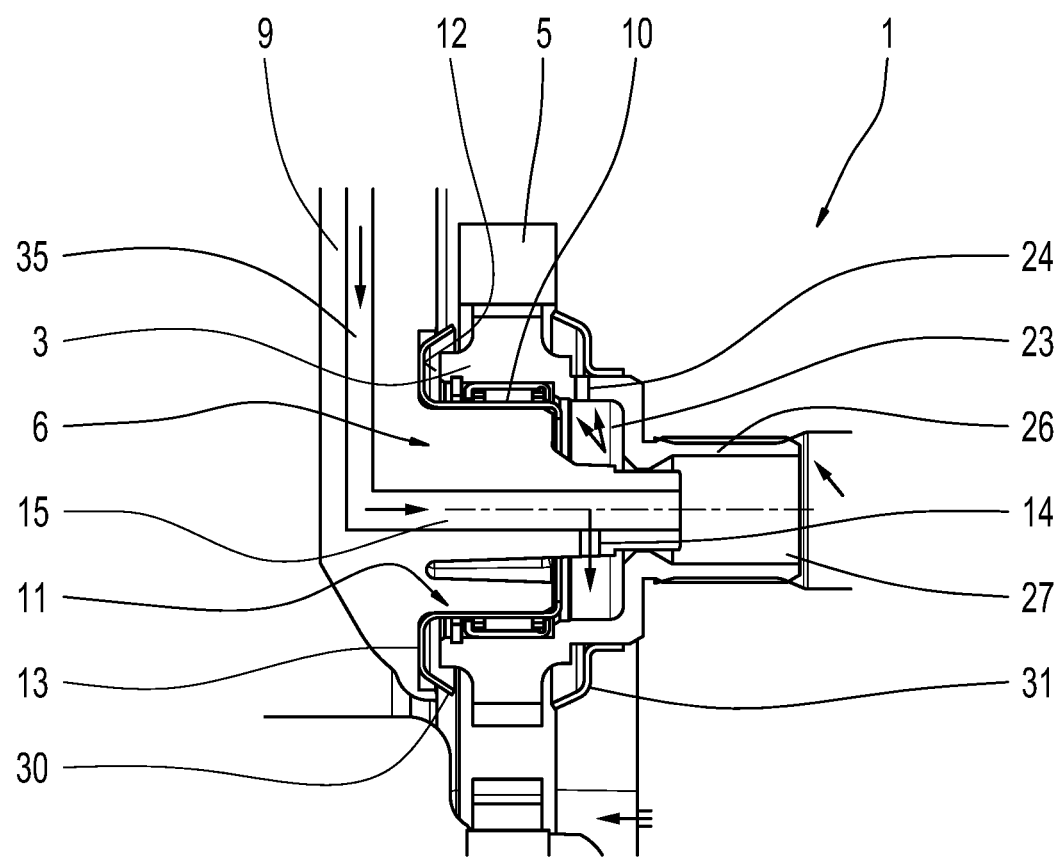
FIG. 2 shows an enlarged representation of one part of the flexible traction drive mechanism according the first exemplary embodiment of the invention.

FIG. 2 shows an enlarged representation of one part of the flexible traction drive mechanism 1 represented in FIG. 1. The flexible traction drive mechanism 1 includes a bearing 10, by which the first traction mechanism wheel 3 is supported on the bearing journal 6. The bearing 10 is a needle bearing which permits an axial movement of the first traction mechanism wheel 3 relative to the bearing journal 6.

The bearing 10 rests on a bush 11 which encloses a part of the bearing journal 6 and is arranged radially between the bearing 10 and the bearing journal 6. The bush 11 includes, at one end, a circumferential, radially protruding collar 13 which acts as a thrust race 12 for axially supporting the first traction mechanism wheel 3.

One end of the oil line 15 is fluidically connected, at one end, to the further oil line 35 which is arranged within the transmission housing 9. The oil line 15 opens, at its other end, in a cavity 27 enclosed by the first traction mechanism wheel 3, in particular by a coupling portion 26 of the first traction mechanism wheel 3. The first traction mechanism wheel 3 is rotationally fixed to the rotor shaft 16 represented in FIG. 1 by the coupling portion 26.

The bearing journal 6 includes yet another bore hole 14, through which the oil located in the oil line 15 flows, as illustrated by the arrows, into an accommodating chamber 23 delimited by the first traction mechanism wheel 3. The oil which has flowed into the accommodating chamber 23 subsequently flows through the bearing 10 to the collar 13. The collar 13 includes, at one end, an oil guide member 30 which is configured for diverting the oil which has flowed through the bearing 10 in the direction of the traction mechanism 5.

The first traction mechanism wheel 3 also includes an additional bore hole 24, through which a portion of the oil which has flowed into the accommodating chamber 23 flows out of the first traction mechanism wheel 3. The first traction mechanism wheel 3 includes yet another oil guide member 31 which is designed and arranged in such a way that it diverts the oil which has flowed out of the additional bore hole 24 in the direction of the traction mechanism 5.

Figure 3:
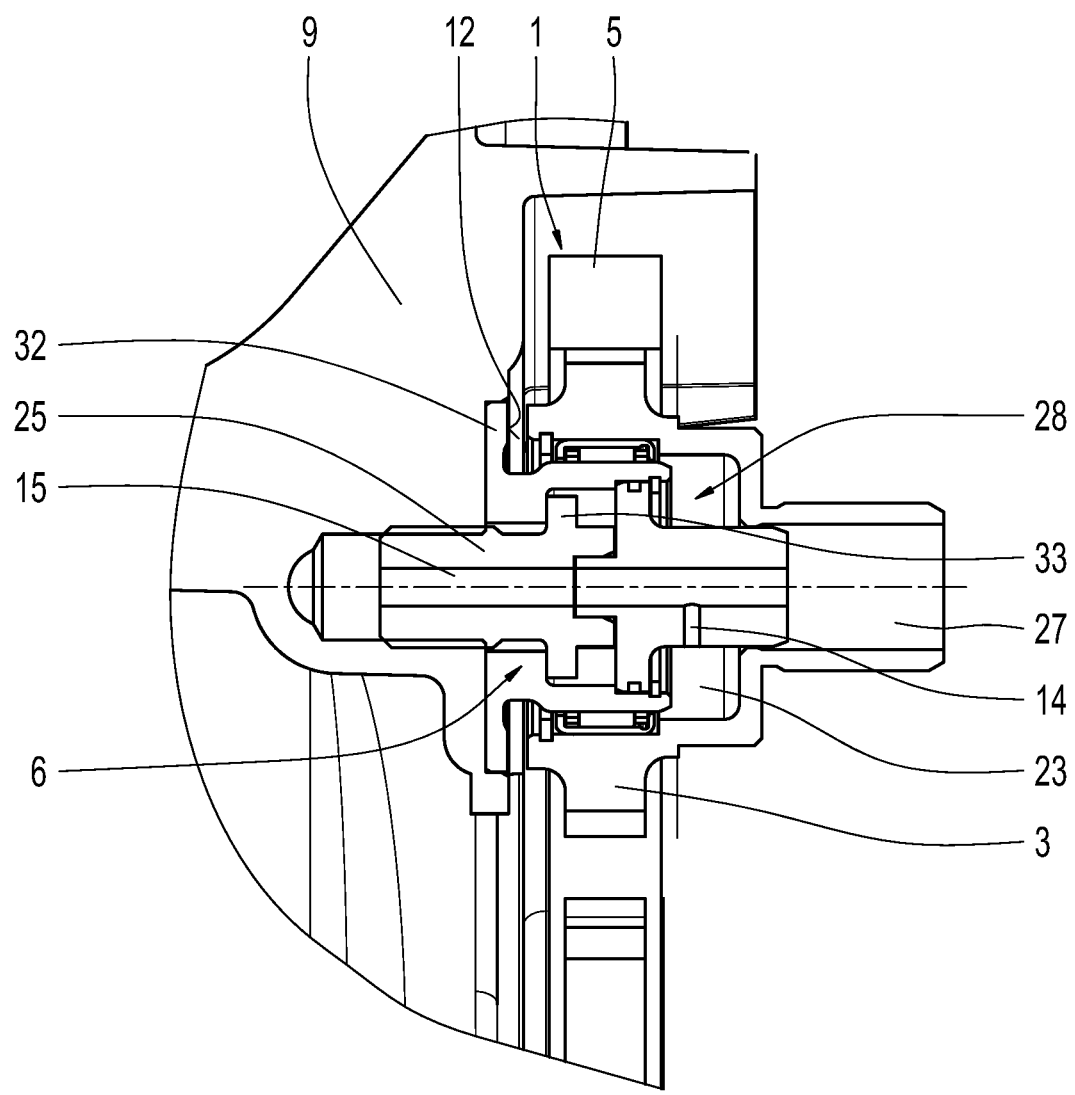
FIG. 3 shows an enlarged representation of one part of a flexible traction drive mechanism according to a second exemplary embodiment of the invention.

FIG. 3 shows an enlarged representation of one part of the flexible traction drive mechanism 1 according to a second exemplary embodiment. The represented flexible traction drive mechanism 1 differs from the flexible traction drive mechanism 1 represented in FIG. 1 in that the bearing journal 6 and the transmission housing 9 are not designed as a single piece, but rather as two pieces.

The bearing journal 6 is breakably or removably connected to the transmission housing 9 by a connecting mechanism 25 in the form of a hollow screw. The connecting mechanism 25 includes, at one end, an external thread which is engaged with an internal thread of the transmission housing 9. In addition, the connecting mechanism 25 includes a circumferential projection 33 which, in the assembled condition of the flexible traction drive mechanism 1, presses the bearing journal 6 against the transmission housing 9. The connecting mechanism 25 includes one part of the oil line 15.

Yet another difference is that a coupling piece 28 is provided in the exemplary embodiment according to FIG. 3. The coupling piece 28 includes the bore hole 14 and another part of the oil line 15. In this case, one end of the coupling piece 28 is connected to the connecting mechanism 25 and is arranged downstream from the connecting mechanism 25. Another end of the coupling piece 28 protrudes into the cavity 27. In particular, the coupling piece 28 is arranged and designed in such a way that the other part of the oil line 15 is fluidically connected to the cavity 27. The coupling piece 28 prevents all the oil from flowing out of the connecting mechanism 25 into the accommodating chamber 23. The coupling piece 28, the connecting mechanism 25, and the bearing journal 6 are arranged coaxially to each other. The further oil line 35 is not represented in FIG. 3.

Yet another difference is that the flexible traction drive mechanism 1 does not include a bush 11. This means, the thrust race 12 is an integral part of the bearing journal 6. In this case, the bearing journal 6 includes a support area 32 for axially supporting the first traction mechanism wheel 3.

Figure 4:
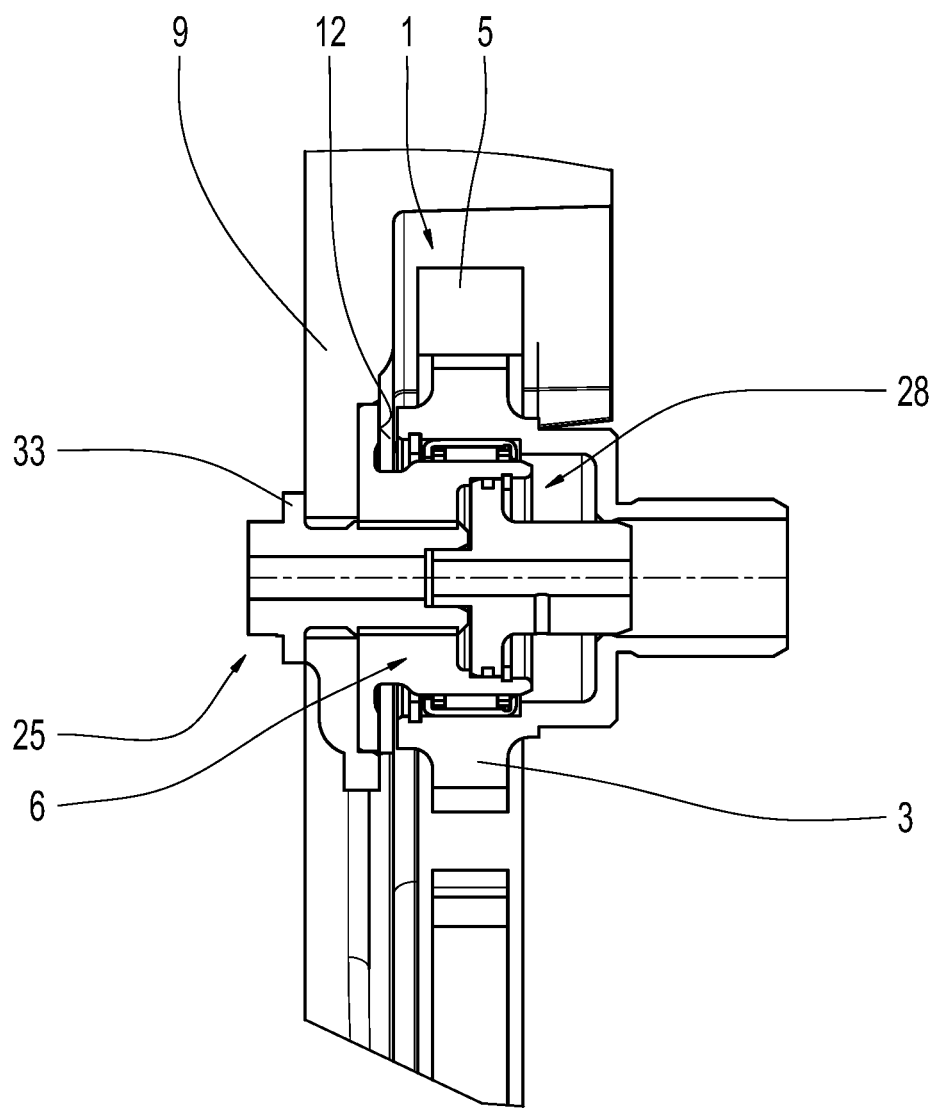
FIG. 4 shows an enlarged representation of one part of a flexible traction drive mechanism according to a third exemplary embodiment of the invention.

FIG. 4 shows an enlarged representation of one part of the flexible traction drive mechanism 1 according to a third exemplary embodiment. The represented flexible traction drive mechanism 1 differs from the flexible traction drive mechanism 1 represented in FIG. 3 in the design of the connecting mechanism 25, in particular in the connection of the connecting mechanism 25 to the transmission housing 9 and to the bearing journal 6.

The connecting mechanism 25 represented in FIG. 4 is connected to the bearing journal 6 by a bolted connection. In the assembled condition of the flexible traction drive mechanism 1, the projection 33 of the connecting mechanism 25 rests against the transmission housing 9. The oil line 15 is connected to yet another oil line 35 which is not represented, wherein the further oil line 35 is not arranged in the transmission housing 9.

Figure 5:
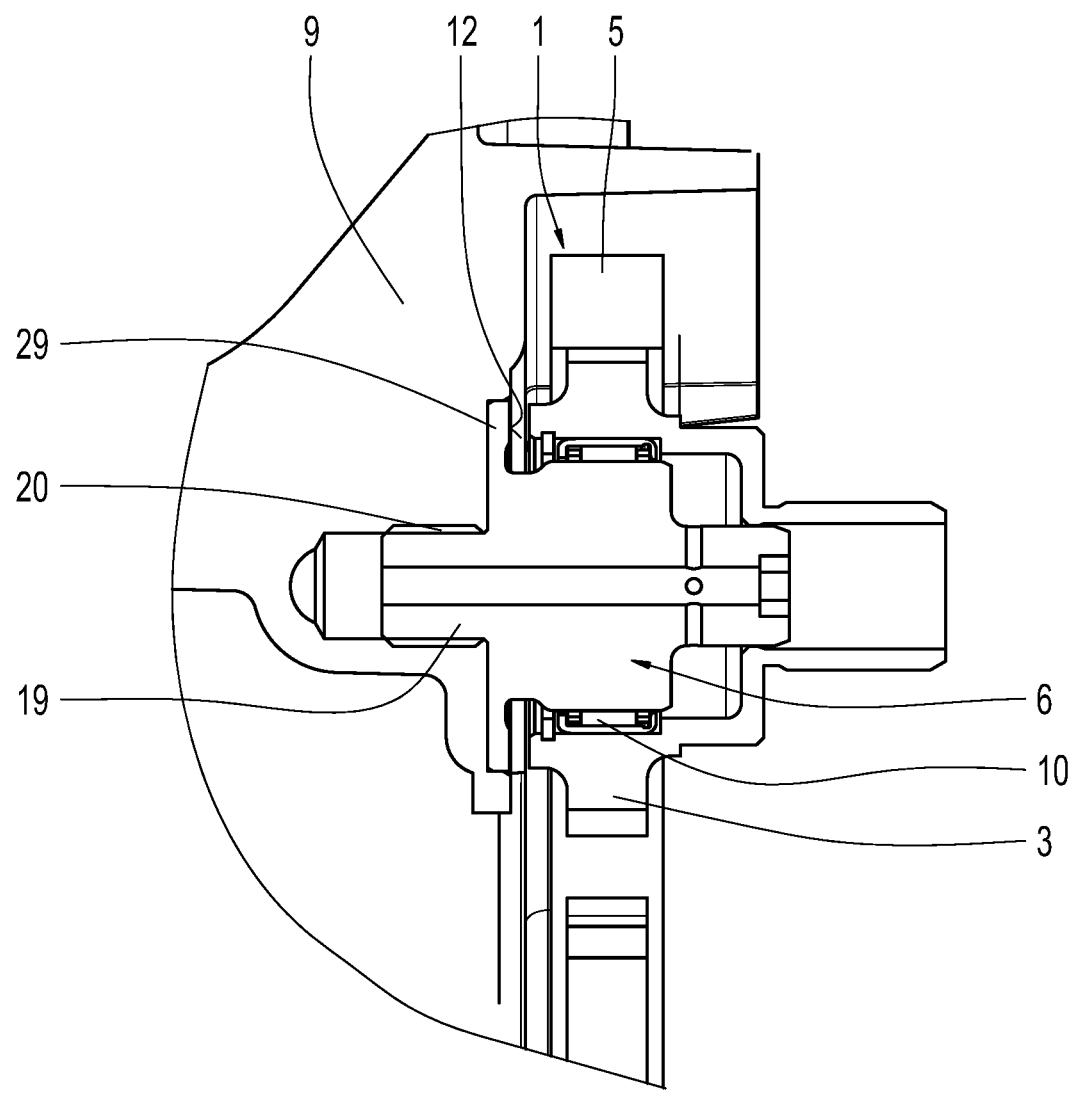
FIG. 5 shows an enlarged representation of one part of a flexible traction drive mechanism according to a fourth exemplary embodiment of the invention.

FIG. 5 shows an enlarged representation of one part of the flexible traction drive mechanism 1 according to a fifth exemplary embodiment. The represented flexible traction drive mechanism 1 differs from the flexible traction drive mechanism 1 represented in FIG. 1 in that the bearing journal 6 and the transmission housing 9 are not designed as a single piece, but rather as two pieces.

For example, the bearing journal 6 can be re-breakably or removably connected, in particular bolted, to another fastening portion 20 of the transmission housing 9 by a fastening portion 19. The fastening portion 19 and the other fastening portion 20 each include a thread. The further oil line 35 is not represented in FIG. 5.

Yet another difference is that the transmission 2 does not include a bush. This means, the thrust race 12 is an integral part of the bearing journal 6. In particular, the thrust race 12 corresponds to the part of the bearing journal 6 which can be brought into contact with the bearing 10. In this case, the bearing journal 6 includes the support area 29 for axially supporting the first traction mechanism wheel 3. The support area 29 also includes the thrust race 12.

Figure 6:
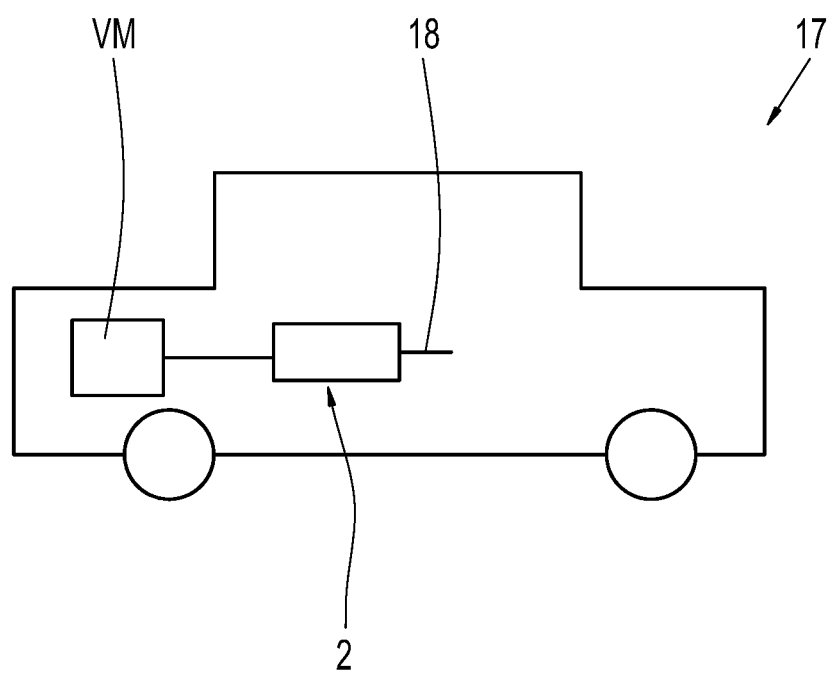
FIG. 6 shows a motor vehicle including the flexible traction drive mechanism according to example aspects of the invention.

FIG. 6 shows a motor vehicle 17 including the transmission 2 according to the invention. As is apparent from FIG. 6, the transmission 2 is drivingly connected to the motor vehicle drive unit VM. The transmission 2 can be drivingly connected by the transmission output shaft 18 to other components of the motor vehicle 17, which are not represented in FIG. 6, such as an axle differential.

Modifications and variations can be made to the embodiments illustrated or described herein without departing from the scope and spirit of the invention as set forth in the appended claims.

REFERENCE CHARACTERS 1 flexible traction drive mechanism
2 transmission
3 first traction mechanism wheel
4 second traction mechanism wheel
5 traction mechanism
6 bearing journal
7 transmission component
8 electric machine
9 transmission housing
10 bearing
11 bush
12 thrust race
13 collar
14 further bore hole
15 oil line
16 rotor shaft
17 motor vehicle
18 transmission output shaft
19 fastening portion
20 other fastening portion of the transmission housing
21 other oil line
22 bore hole
23 other bore hole
24 additional bore hole
25 connecting mechanism
26 coupling portion
27 cavity
28 coupling piece
29 transmission input shaft
30 oil guide member
31 further oil guide member
32 support area
33 projection
34 wiring 35 further oil line
36 shaft bearing
37 outlet opening
M central axis
HG main transmission
VM motor vehicle drive unit

The invention claimed is:

1. A transmission (2) for a motor vehicle (17), comprising:
an electric motor (8); and
a flexible traction drive mechanism (1) including a first traction mechanism wheel (3) and a second traction mechanism wheel (4), the first traction mechanism wheel (3) rotationally fixed to a rotor shaft (16) of the electric motor (8), the second traction mechanism wheel (4) rotationally fixable to a transmission component (7), the second traction mechanism wheel (4) drivingly connected to the first traction mechanism wheel (3) by a traction mechanism (5);
a bearing journal (6) for supporting the first traction mechanism wheel (3), an oil line (15) extending through the bearing journal (6) such that oil is flowable through oil line (15) to the electric motor (8); and
a connecting mechanism (25), wherein the connecting mechanism (25) is one or more of
removably connected to the bearing journal (6) such that the bearing journal (6) is connected to a transmission housing (9) in a form-fit and/or friction-locking manner with the connecting mechanism (25),
arranged coaxially to the bearing journal (6), the rotor shaft (16), or both the bearing journal (6) and the rotor shaft (16), and
partially enclosed by the bearing journal (6).

2. The transmission (2) of claim 1, wherein the oil line (15) extends axially in the bearing journal (6).

3. The transmission (2) of claim 2, wherein oil from another oil line (35) arranged in a transmission housing (9) is flowable through the oil line (15) to the electric motor (8).

4. The transmission (2) of claim 1, wherein oil from another oil line (35) arranged in a transmission housing (9) is flowable through the oil line (15) to the electric motor (8).

5. The transmission (2) of claim 1, wherein the rotor shaft (16) is one or both of:
arranged coaxially to the bearing journal (6); and
includes another oil line (21) fluidically connected to the oil line (15).

6. The transmission (2) of claim 1, wherein the rotor shaft (16) includes at least one bore hole (22, 23) through which oil is flowable to at least one component of the electric motor (8).

7. The transmission (2) of claim 1, further comprising a bearing (10), the first traction mechanism wheel (3) radially supported on the bearing journal (6) by the bearing (10).

8. The transmission (2) of claim 7, wherein oil from the oil line (15) is flowable through a further bore hole (14) to the bearing (10).

9. The transmission (2) of claim 1, wherein a portion of the oil line (15) extends through the connecting mechanism (25).

10. The transmission (2) of claim 1, wherein the connecting mechanism (25) includes a portion of the oil line (15).

11. The transmission (2) of claim 1, wherein the transmission component (7) includes a shaft which is rotationally fixed to the second traction mechanism wheel (4).

12. The transmission (2) of claim 1, wherein the transmission component (7) includes a clutch component of a clutch, the clutch component rotationally fixed to the second traction mechanism wheel (4).

13. The transmission (2) of claim 1, wherein the electric motor (8) is radially offset from the transmission component (7).

14. A motor vehicle, comprising the transmission (2) of claim 1.

15. A transmission (2) for a motor vehicle (17), comprising:
an electric motor (8); and
a flexible traction drive mechanism (1) including a first traction mechanism wheel (3) and a second traction mechanism wheel (4), the first traction mechanism wheel (3) rotationally fixed to a rotor shaft (16) of the electric motor (8), the second traction mechanism wheel (4) rotationally fixable to a transmission component (7), the second traction mechanism wheel (4) drivingly connected to the first traction mechanism wheel (3) by a traction mechanism (5);
a bearing journal (6) for supporting the first traction mechanism wheel (3),
wherein an oil line (15) extends through the bearing journal (6) such that oil is flowable through oil line (15) to the electric motor (8),
wherein the first traction mechanism wheel (3) includes a coupling portion (26) for rotationally fixing the first traction mechanism wheel (3) to the rotor shaft (16), and
wherein the coupling portion (26) encloses a cavity (27), and the connecting mechanism (25) extends into the cavity (27).

16. A transmission (2) for a motor vehicle (17), comprising:
an electric motor (8); and
a flexible traction drive mechanism (1) including a first traction mechanism wheel (3) and a second traction mechanism wheel (4), the first traction mechanism wheel (3) rotationally fixed to a rotor shaft (16) of the electric motor (8), the second traction mechanism wheel (4) rotationally fixable to a transmission component (7), the second traction mechanism wheel (4) drivingly connected to the first traction mechanism wheel (3) by a traction mechanism (5);
a bearing journal (6) for supporting the first traction mechanism wheel (3),
wherein an oil line (15) extends through the bearing journal (6) such that oil is flowable through oil line (15) to the electric motor (8),
wherein the first traction mechanism wheel (3) includes a coupling portion (26) for rotationally fixing the first traction mechanism wheel (3) to the rotor shaft (16), and
wherein the coupling portion (26) encloses a cavity (27), a coupling piece (28) extends into the cavity (27), and another portion of the oil line (15) extends through the coupling piece (28).

17. A transmission (2) for a motor vehicle (17), comprising:
an electric motor (8); and
a flexible traction drive mechanism (1) including a first traction mechanism wheel (3) and a second traction mechanism wheel (4), the first traction mechanism wheel (3) rotationally fixed to a rotor shaft (16) of the electric motor (8), the second traction mechanism wheel (4) rotationally fixable to a transmission component (7), the second traction mechanism wheel (4)

drivingly connected to the first traction mechanism wheel (3) by a traction mechanism (5);

a bearing journal (6) for supporting the first traction mechanism wheel (3), wherein an oil line (15) extends through the bearing journal (6) such that oil is flowable through oil line (15) to the electric motor (8), wherein the first traction mechanism wheel (3) includes a coupling portion (26) for rotationally fixing the first traction mechanism wheel (3) to the rotor shaft (16), and wherein the coupling portion (26) encloses a cavity (27), a coupling piece (28) extends into the cavity (27), and the coupling piece (28) delimits another portion of the oil line (15).

* * * * *